US012573577B2

(12) United States Patent
Hållstedt et al.

(10) Patent No.: US 12,573,577 B2
(45) Date of Patent: Mar. 10, 2026

(54) LIQUID JET TARGET X-RAY SOURCE

(71) Applicant: Excillum AB, Kista (SE)

(72) Inventors: Julius Hållstedt, Kista (SE); Ulf Lundström, Kista (SE); Per Takman, Kista (SE)

(73) Assignee: Excillum AB, Kista (SE)

( * ) Notice: Subject to any disclaimer, the term of this patent is extended or adjusted under 35 U.S.C. 154(b) by 124 days.

(21) Appl. No.: 18/555,466

(22) PCT Filed: Apr. 6, 2022

(86) PCT No.: PCT/EP2022/059126
§ 371 (c)(1),
(2) Date: Oct. 13, 2023

(87) PCT Pub. No.: WO2022/218778
PCT Pub. Date: Oct. 20, 2022

(65) Prior Publication Data

US 2024/0194437 A1 Jun. 13, 2024

(30) Foreign Application Priority Data

Apr. 15, 2021 (EP) .................................... 21168620

(51) Int. Cl.
*H01J 35/18* (2006.01)
*H01J 35/00* (2006.01)
*H01J 35/08* (2006.01)

(52) U.S. Cl.
CPC ......... *H01J 35/18* (2013.01); *H01J 2235/082* (2013.01); *H01J 2235/18* (2013.01)

(58) Field of Classification Search
CPC ...... H01J 35/18; H01J 35/112; H01J 2235/18; H01J 2235/082
See application file for complete search history.

(56) References Cited

U.S. PATENT DOCUMENTS 7,173,999 B2 2/2007 Buijsse
2016/0268094 A1* 9/2016 Yun ....................... H01J 35/147
2017/0345611 A1 11/2017 Heid

FOREIGN PATENT DOCUMENTS

EP 2956954 A1 12/2015
EP 3493239 A1 6/2019
(Continued)

OTHER PUBLICATIONS

International Search Report and Written Opinion for PCT Application No. PCT/EP2022/059126, mailed on Jul. 26, 2022, 12 pages.
(Continued)

*Primary Examiner* — Mark R Gaworecki
(74) *Attorney, Agent, or Firm* — Brake Hughes Bellermann LLP

(57) ABSTRACT

An X-ray source is provided comprising a target generator configured to generate a liquid jet having an elongated cross with a major axis and a minor axis; an electron source configured to generate an electron beam arranged to interact with the liquid jet in an interaction region to generate X-ray radiation; and an X-ray transparent window arranged to transmit X-ray radiation generated in the interaction region, wherein the X-ray transparent window is located for extraction of X-ray radiation at an angle $\alpha$ relative to the major axis; wherein the target generator is configured to generate the liquid jet such that said jet has a thickness at the interaction region, along a propagation direction of the electron beam, that is less than an electron penetration depth of the electron beam in the liquid jet. A corresponding method for generating X-ray radiation is also provided.

18 Claims, 8 Drawing Sheets

(56) References Cited

FOREIGN PATENT DOCUMENTS

| | | | | | |
|---|---|---|---|---|---|
| JP | 2006527469 | A | | 11/2006 | |
| JP | 2016511924 | A | | 4/2016 | |
| JP | 2016136523 | A | | 7/2016 | |
| JP | 2019537206 | A | | 12/2019 | |
| JP | 2021504906 | A | | 2/2021 | |
| SE | 1751036 | A1 | | 9/2017 | |
| WO | WO-2010112048 | A1 | * | 10/2010 | .............. H01J 35/12 |
| WO | 2014125389 | A1 | | 8/2014 | |
| WO | WO-2015052039 | A1 | * | 4/2015 | .............. H01J 35/08 |
| WO | 2015168473 | A1 | | 11/2015 | |
| WO | WO-2019234217 | A1 | * | 12/2019 | ............... H05G 1/52 |
| WO | 2020094533 | A1 | | 5/2020 | |

OTHER PUBLICATIONS

English translation Office Action for Japanese Patent Application No. 2023-563066, mailed on Jan. 6, 2026, 2 pages.

* cited by examiner (a) (b) (c)

LIQUID JET TARGET X-RAY SOURCE

CROSS REFERENCE TO RELATED APPLICATIONS

This application is a 35 U.S.C. § 371 National Phase Entry Application from PCT Application No. PCT/EP2022/059126, filed on Apr. 6, 2022, entitled "LIQUID JET TARGET X-RAY SOURCE", and designating the U.S., which in turn claims priority to EP Application No. 21168620.9 filed on Apr. 15, 2021, the disclosures of which are incorporated herein in their entireties by reference.

FIELD

The present invention relates to liquid jet target x-ray sources and associated methods.

BACKGROUND

Liquid jet target X-ray sources are generally known in the art. An electron beam is directed towards a liquid jet of target material, and X-ray radiation is generated upon impact of the electron beam upon the target. Various shapes for the electron beam cross section and for the liquid jet target have been explored. For example, WO 2019/106145 discloses an X-ray source that comprises a liquid target shaper that is configured to shape the liquid target such that it has a non-circular cross section with respect to a flow axis of the liquid target. In general, such liquid target may have an oval or elliptic cross sectional shape. The cross section may even be so elongated that the surface of the liquid target upon which the electron beam impacts can be viewed as being substantially flat. In the extreme, such liquid target can be referred to as a liquid curtain. Using such geometry, a wider impact surface for the electron beam may be used without having to increase the flow rate of the liquid target, and it facilitates the use of more than one electron beam on the same liquid jet.

SUMMARY

In the following, reference will be made to the X-ray absorption length, which is defined as the distance over which the X-ray flux, due to absorption in the target material, decreases by a factor 1/e.

Reference will also be made to the electron penetration depth, which is a measure indicating the maximum range an electron may penetrate a target upon impact. The electron penetration depth d may be approximated as $$d = \frac{0.1E_0^{1.5}}{\rho} \quad (1)$$

where d is in in microns (μm), $E_0$ is the energy of the incoming electrons measured in keV, and ρ is the density of the target material measured in g/cm$^3$.

The present invention provides liquid jet target X-ray sources using a liquid jet target having an elongated, preferably convex, cross section with a thickness in the propagation direction of the electron beam that is smaller than the electron penetration depth into the target. Preferably, the elongation (eccentricity) of the liquid jet cross section is so pronounced that the electron impact surface can be regarded as being substantially flat. By having the thickness smaller than the electron penetration depth, the apparent X-ray spot will be determined partially by the thickness of the target jet along the propagation direction of the electron beam. The liquid jet may, at least an the location of the impact surface, propagate freely relative the surrounding environment. The material of the liquid jet may hence be exposed to the environment in the chamber of the X-ray source. The liquid jet is preferably a liquid metal jet. The liquid metal may be an alloy. Examples of metals suitable for use with the present invention are In, Sn, Pb, Bi, and Ga. As generally known in the field, the use of a liquid metal target provides a number of advantages over other technologies. For example, any issue related to permanent target damage is eliminated since the target is continuously regenerated and already in a liquid state. Such liquid metal target thus supports higher electron-beam powers and can therefore provide an increased X-ray flux compared to other types of X-ray sources.

The electron beam is typically generated using an acceleration voltage of at least 10 kV. In some implementations, the acceleration voltage may be at least 50 kV or even over 100 kV. The power of the electron beam may be at least 38 W, such as at least 50 W or at least 100 W.

Although the cross section of each conceivable liquid jet target is not necessarily elliptical, the cross section can still be described as having a major axis along the largest dimension, and a minor axis along the smallest dimension. The major axis thus spans from edge to edge (apex to apex) of the elongated cross section, while the minor axis spans from face to face thereof.

For a general understanding of the principles of the present invention, the cross section of the target jet can even be assumed to be a rectangle having sides corresponding to the major axis and the minor axis, respectively.

It will be understood, however, that the liquid jet target in actual implementations may have a cross section that is elliptical or at least convex without sharp corners. Also, other cross-sectional shapes are conceivable, such as a substantially flat part connecting two rounded segments at the edges, i.e. resembling a 2D dumbbell shape. The cross sectional shape of the target jet may still be characterized by one major axis and one minor axis. In general, and also for more exotic shapes, the major axis can be defined as being along the largest dimension of the target cross section and the minor axis can be defined as a perpendicular bisector to the major axis.

In a first embodiment, an X-ray source is configured such that the electron beam impacts the target at a distance from the edges (or apexes) thereof at a direction perpendicular to the major axis. For example, the electron beam as measured by the full width at half maximum is separated from the edges/apexes of the liquid target by at least the X-ray absorption length within the target material. Generated X-ray radiation is extracted in reflection and at an angle relative to the major axis of the target jet typically such that the apparent X-ray spot along the extraction angle is smaller than the extension of the electron beam perpendicular to the major axis.

In a second embodiment, an X-ray source is configured such that the electron beam impacts the target at an edge or apex thereof, wherein the center of the electron beam is separated from an edge/apex of the target jet by less than the X-ray absorption length. Generated X-ray radiation may then be extracted from the X-ray source also in a direction parallel to the major axis of the target jet without suffering from excessive reabsorption. As will be understood, for an extraction angle parallel to the major axis of the target jet cross section, the apparent X-ray spot will have an extension in a direction across the target jet thickness that is equal to the thickness of the target, i.e. the size of the X-ray spot will be determined, in one dimension, by the target jet thickness along the minor axis thereof.

In a third embodiment, the generated X-ray radiation is extracted in transmission, i.e. generally in the propagation direction of the electron beam. The achievable spot size of the X-ray radiation is limited by the scattering of the electron beam within the target, which leads to a gradual widening of the electron beam as it penetrates the target material. Hence, the thinner the target is in the propagation direction of the electron beam, the less is the widening of the electron beam and, consequently, the smaller is the X-ray spot size. In this embodiment, the electron beam may impact the target either at an edge/apex thereof or at a distance from the edges/apexes.

Several modifications and variations are possible within the scope of the invention. In particular, X-ray sources comprising more than one target, or more than one electron beam are conceivable within the scope of the present inventive concept. Furthermore, X-ray sources of the type described herein may advantageously be combined with X-ray optics and/or detectors tailored to specific applications exemplified by but not limited to medical diagnosis, non-destructive testing, lithography, crystal analysis, microscopy, materials science, microscopy surface physics, protein structure determination by X-ray diffraction, X-ray photo spectroscopy (XPS), critical dimension small angle X-ray scattering (CD-SAXS), wide-angle X-ray scattering (WAXS), and X-ray fluorescence (XRF).

BRIEF DESCRIPTION OF THE DRAWINGS

In the following detailed description, reference will be made to the accompanying drawings, on which:

FIG. 6 shows typical X-ray absorption lengths and electron penetration depths for Ga and In;

DETAILED DESCRIPTION

Figure 1A:
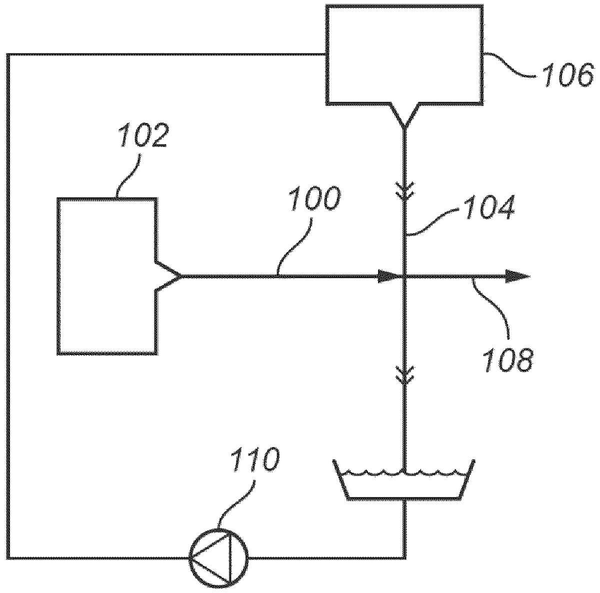
FIG. 1*a* schematically shows a liquid jet X-ray source.

An X-ray source according to the present invention is schematically shown in FIG. 1*a*. An electron beam 100 is generated from an electron source 102, such as e.g. an electron gun comprising a high-voltage cathode, and a liquid jet target 104 is provided from a target generator 106. The electron beam 100 is directed towards an impact portion of the liquid target 104 such that the electron beam 100 interacts with the liquid target 104 to generate X-ray radiation 108. The liquid target 104 is preferably collected and returned to the target generator 106 by means of a pump 110, such as a high-pressure pump adapted to raise the pressure to at least 10 bar, preferably to at least 50 bar, for generating the liquid target 104.

The liquid target 104 may be formed by the target generator 106 using a nozzle through which a fluid, such as e.g. liquid metal or liquid alloy, may be ejected to form the liquid target 104. It will be understood that an X-ray source comprising multiple liquid targets, and/or multiple electron beams, is possible within the scope of the inventive concept. To generate the liquid jet at a high propagation speed, the pressure used for ejecting the liquid (e.g. metal or alloy) through the nozzle may be at least 50 bar, or at least 100 bar, or at least 200 bar. A high-pressure pump, or possibly a two stage pump arrangement, is used for recirculating the liquid and for raising the pressure to the desired level before the liquid is ejected through the nozzle.

Still referring to FIG. 1*a*, the X-ray source may comprise an X-ray window (not shown) configured to allow X-ray radiation, generated from the interaction of the electron beam 100 and the liquid target 104, to be transmitted. The X-ray window may be located substantially perpendicular to a direction of travel of the electron beam.

Figure 1B:
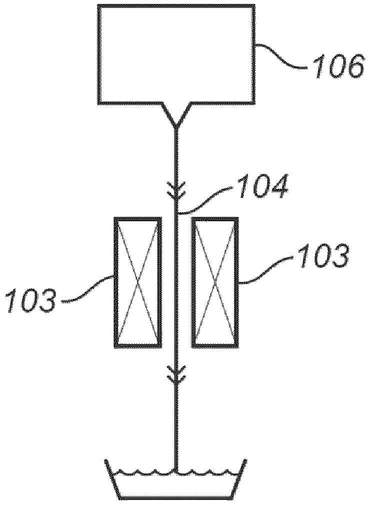
FIG. 1*b* schematically shows a liquid jet X-ray source comprising a magnetic field generator for shaping the liquid jet.

Referring now to FIG. 1*b*, a magnetic field generator 103 is shown in relation to the target generator 106 and the liquid target 104. The magnetic field generator 103 and the liquid target 104 may be comprised in an X-ray source that may be similarly configured as the X-ray source discussed in connection with FIG. 1*a*. It is to be understood that the magnetic field generator 103 may extend further along the flow axis, and that the placement of the magnetic field generator 103 shown is merely an example among several different configurations. In the present example, the magnetic field generator 103 may comprise a plurality of elements for generating a magnetic field for modifying or shaping a cross section of the liquid target 104. Examples of such means may e.g. include electromagnets, which e.g. may be arranged at different sides of a path of the liquid target 104 so as to affect its shape.

A liquid jet target X-ray source is provided, which is configured such that an electron beam impacts a liquid jet target to generate X-ray radiation, wherein the liquid jet has an elongated cross section. In general, it is preferred that the electron beam impacts the target jet along a minor axis of the elongated cross section thereof. X-ray radiation is generated in an interaction region defined by the extension of the electron beam and the penetration thereof into the target material. The electron beam may have an elliptical cross section with a long axis (referred to herein as the width) perpendicular to the travel direction of the liquid jet, and a short axis (height) in the orthogonal direction along the travel direction of the liquid jet. The interaction region will thus have a cross section that is defined by the width and height of the electron beam cross section. The width of the liquid jet may be at least 500 μm, such as at least 1000 μm.

In prior art systems, where the thickness of the target jet is larger than the electron penetration depth into the target material, X-ray radiation will be generated in a region of the target limited by the electron penetration depth. In case the target jet is thinner, along the propagation direction of the electron beam, than the electron penetration depth, and according to embodiments of the present invention, the interaction region will be defined by the thickness of the target jet. The size of the X-ray spot along any take-off angle, i.e. in any extraction direction, will be the projection of the interaction region in that direction.

For efficient extraction of X-ray radiation, however, the generated X-ray radiation should not be excessively reabsorbed by the target. The distance from any point of the interaction region, along the extraction direction, to the surface of the target jet should therefore be less than the X-ray absorption length. It will be understood, however, that the X-ray absorption length does not define any abrupt cut-off, but that there is a gradual decrease in X-ray flux. The X-ray absorption length is thus used as a convenient measure of the characteristic X-ray reabsorption.

Figure 2:
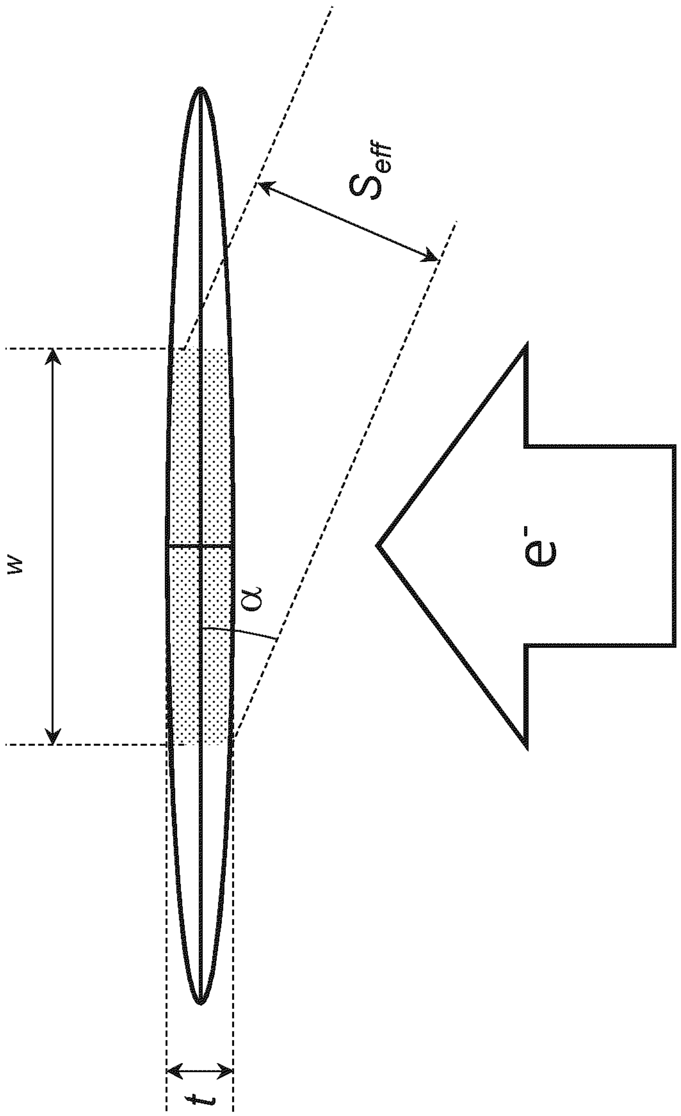
FIG. 2 illustrates a first embodiment of the present invention.

In a first embodiment, with reference to FIG. 2, an X-ray source is configured such that the electron beam impacts the target at a distance from the edges or apexes thereof. For example, the electron beam as measured by the full width at half maximum is separated from the edges/apexes of the liquid jet target by at least the X-ray absorption length within the target material. Generated X-ray radiation is extracted in reflection and at an angle relative to the major axis of the target jet. For an extraction angle normal to the major axis, i.e. along the minor axis of the target jet cross section, the effective X-ray spot size will be determined by the extension of the electron beam. For non-normal extraction angles, the effective spot size will be determined by the geometrical projection of the interaction region along that direction, and by the electron penetration depth or the target thickness (whichever is shorter). For a given extraction angle, the effective spot size of the X-ray radiation can thus be reduced by letting the thickness of the target jet be shorter than the electron penetration depth. Assuming that X-ray radiation is extracted at an angle α relative to the major axis of the target jet, and noting that only radiation that has traversed a distance less than the X-ray absorption length in the target contribute to the X-ray spot size, the effective spot size may be generally expressed as $$S_{eff} = w\sin\alpha + \min\left\{\begin{matrix} t \\ d \\ \lambda\sin\alpha \end{matrix}\right\}\cos\alpha \tag{2}$$

where $S_{eff}$ is the effective spot size of the X-ray radiation along the extraction angle α relative to the major axis of the target jet, w is the width of the electron beam when impacting the target jet, λ is the X-ray absorption length, t is the thickness of the target in the propagation direction of the electron beam, and d is the electron penetration depth. The X-ray spot size in a dimension orthogonal to $S_{eff}$ will be determined by the height of the electron beam (i.e. the size of the electron beam along the travel direction of the target jet), and will be equal to the height of the electron beam if X-ray radiation is extracted in a direction orthogonal to the travel direction of the target jet. Evidently from (2) above, the spot size will go to zero as the extraction angle goes to zero. However, when reabsorption become pronounced, the total X-ray flux will also decrease. This may be understood as an effective penetration depth, i.e. only electrons having penetrated to a depth less than the projection of the absorption length (λ sin α) will be able to generate X-ray radiation that contributes to the extracted X-ray beam. In embodiments of the present invention, the thickness of the target jet in the propagation direction of the electron beam is less than the electron penetration depth, i.e. t<d.

Figure 3:
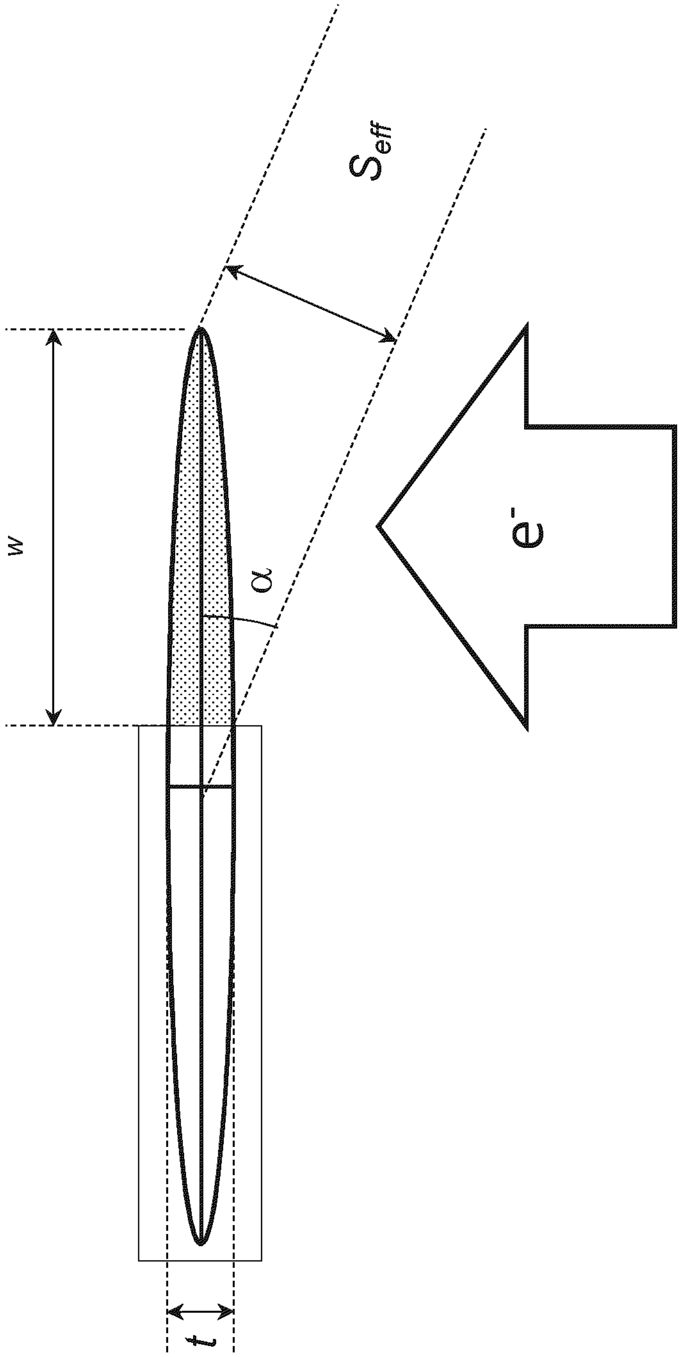
FIG. 3 illustrates a second embodiment of the present invention.

In a second embodiment, with reference to FIG. 3, the interaction region is located at or near an edge/apex of the target jet. An X-ray source according to the second embodiment is thus configured such that the electron beam impacts the target at an edge or apex thereof, typically meaning that the center of the electron beam is separated from one edge/apex of the target jet by less than the X-ray absorption length. Generated X-ray radiation may then be extracted from the X-ray source in a direction parallel to the major axis of the target jet cross section without suffering from excessive reabsorption. For extraction angles close to the minor axis, this embodiment will produce an X-ray spot similar to that of the first embodiment above. However, for extraction angles along or close to the major axis of the target jet cross section, this second embodiment may give a smaller X-ray spot while preserving the X-ray flux. Different combinations of electron beam widths, electron penetration depths, jet thicknesses, and X-ray absorption lengths will give different characteristics. In this embodiment, an extraction angle parallel to the major axis of the target cross section will produce an X-ray spot size that is defined by the maximum thickness of the part of the target jet exposed to the electron beam (provided that it is smaller than the electron penetration depth). In the perpendicular direction, i.e. along the target jet travel direction, the X-ray spot size will be determined by the electron beam focusing together with electron beam scattering within the target material. Since extraction of X-ray radiation parallel to the major axis of the target jet cross section, i.e. from the edge/apex of the target jet, is not affected by reabsorption, the spot size will be independent of the X-ray absorption length. Thus, the effective spot size may be expressed generally as $$S_{eff} = w\sin\alpha + t\cos\alpha \tag{3}$$

where, again, α is the extraction angle relative to the major axis of the target jet cross section, w is the width of the electron beam when impacting the target jet, and t is the thickness of the target in the propagation direction of the electron beam, and considering that t<d in embodiments of the present invention.

For the second embodiment, X-ray radiation will be emitted also when the extraction angle goes to zero (i.e. when the extraction is parallel to the major axis). Provided that the respective projection of the absorption length is longer than the width and depth of the interaction region, respectively, the total X-ray flux will, to a first approximation, be independent of the extraction angle.

Figure 4:
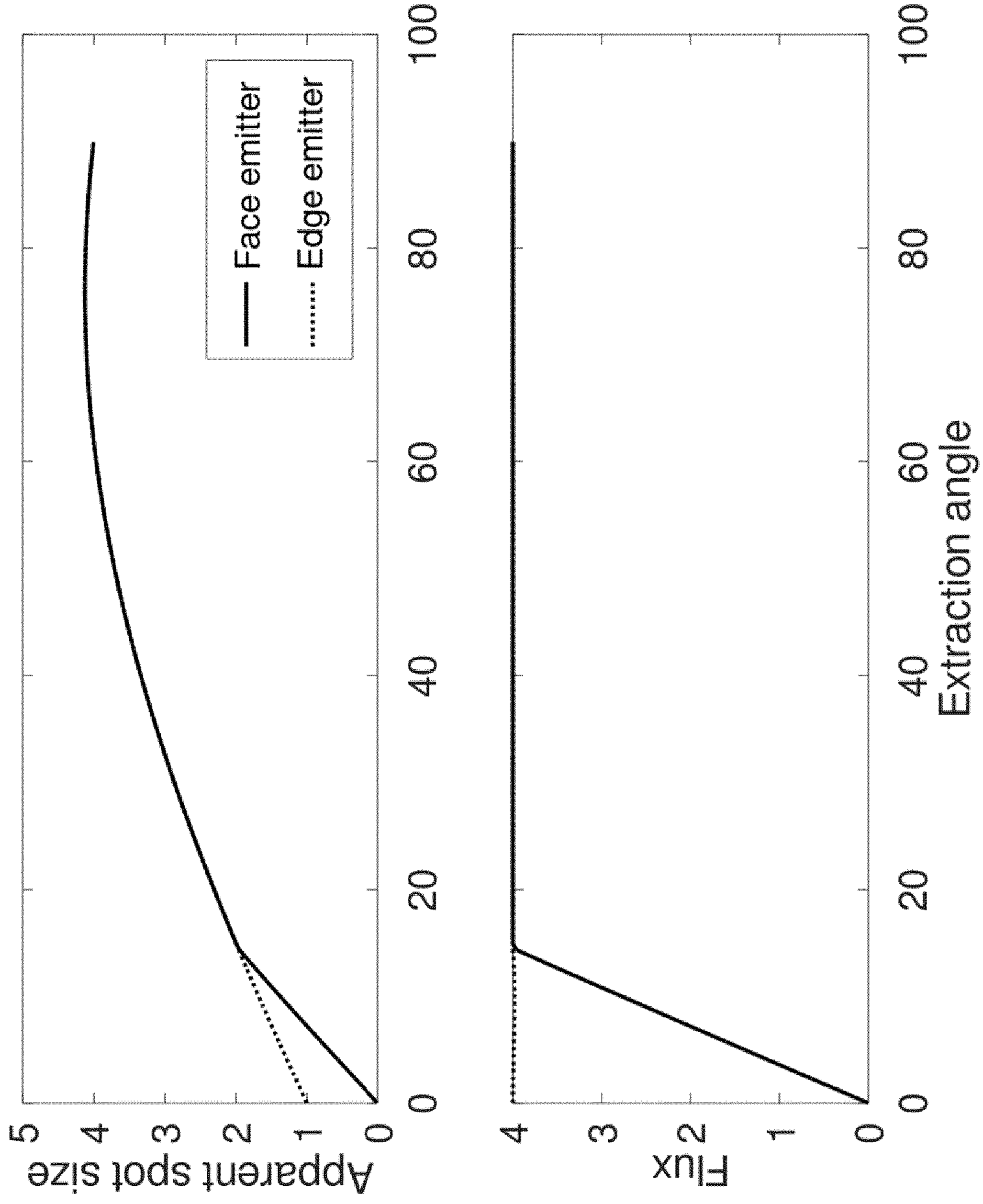
FIG. 4 is a graph that illustrates how spot size and X-ray flux may vary as a function of extraction angle.

FIG. 4 shows a graph that illustrates how spot size and X-ray flux may vary as a function of extraction angle for the first embodiment ("face emitter") and the second embodiment ("edge emitter"). In the shown example, the electron beam spot size has been set to 4 by 1 units (width and height respectively) and the jet thickness has been set to 1 unit (shorter than the electron penetration depth according to the invention), while the absorption length has been set to 4 units. The apparent spot sizes have been calculated according to the expressions above. The total X-ray flux has been calculated as the volume of the part of the interaction region that contributes to the emitted X-ray radiation. Provided that the desire is to obtain a symmetric X-ray spot for the edge emitter, an extraction angle along the major axis of the target jet would be preferred giving an apparent spot size of 1 by 1 units and a total X-ray flux of 4 units. For the face emitter, an angle of about 7 degrees gives a corresponding symmetric spot and a total flux of about 2 units. A preferred extraction angle for this embodiment may generally be about 3-10 degrees, or at least less than about 20 degrees.

Figure 5:
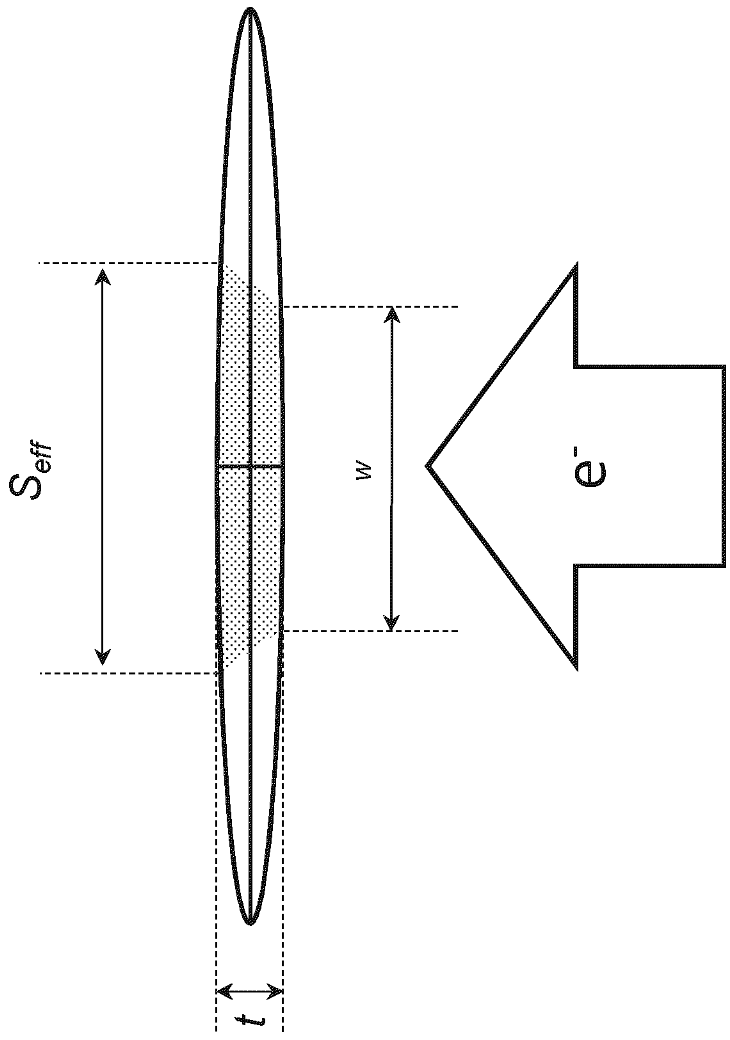
FIG. 5 illustrates a third embodiment of the present invention.

A third embodiment, with reference to FIG. 5, utilizes a transmission target geometry, which means that X-ray radiation emitted in the direction of the electron beam is utilized. Typically, a circular electron beam spot would be employed in the third embodiment. As the electrons penetrate into the target jet, they will be scattered such that the width of the electron beam is widened, leading to a broadening of the effective X-ray spot. Assuming a point-like electron beam, the width at a depth inside the target material corresponding to the electron penetration depth may be approximated as $$y = \frac{0.077E_0^{1.5}}{\rho} \quad (4)$$

where y is the width expressed in microns (μm). Thus, the electrons will be distributed within a cone or frustum with an apex angle of $\tan^{-1}(0.077/(2\times0.1))$ from the direction of the incoming electron beam, and the effective or apparent spot size will increase as the electrons penetrate through the target material. The effective or apparent spot size may be written as $$S_{eff} = w + \frac{0.077}{0.1}\min\begin{Bmatrix} t \\ d \end{Bmatrix} \quad (5)$$

where $S_{eff}$ is the effective spot size of the X-ray radiation, w is the width of the electron beam when impacting the target jet, t is the thickness of the target in the propagation direction of the electron beam, and d is the electron penetration depth. Here it has been assumed that the target thickness is less than the X-ray absorption length.

If the target is thinner than the electron penetration depth in the propagation direction of the electron beam, this will limit the amount of scattering, and thus widening, that can occur, and will thereby also limit the effective spot size. The widening of the X-ray spot will thus be smaller than the width y according to equation (4) that would have been the result if the target was thicker than the electron penetration depth. On the other hand, there will then also be less target material available for the electrons to interact with, thus reducing the amount of X-ray radiation produced as compared to a thicker target (which is generic to transmission targets). As an example, a situation can be considered where the electron penetration depth is comparable to the electron beam spot size. In this case, the spot will widen almost 80% as the electrons penetrate the target. Making the electron beam spot even smaller will make the relative change in spot size larger. Thus, limiting the electron scattering by making the target thinner is crucial to achieve a small spot size for a transmission target.

Figure 6:
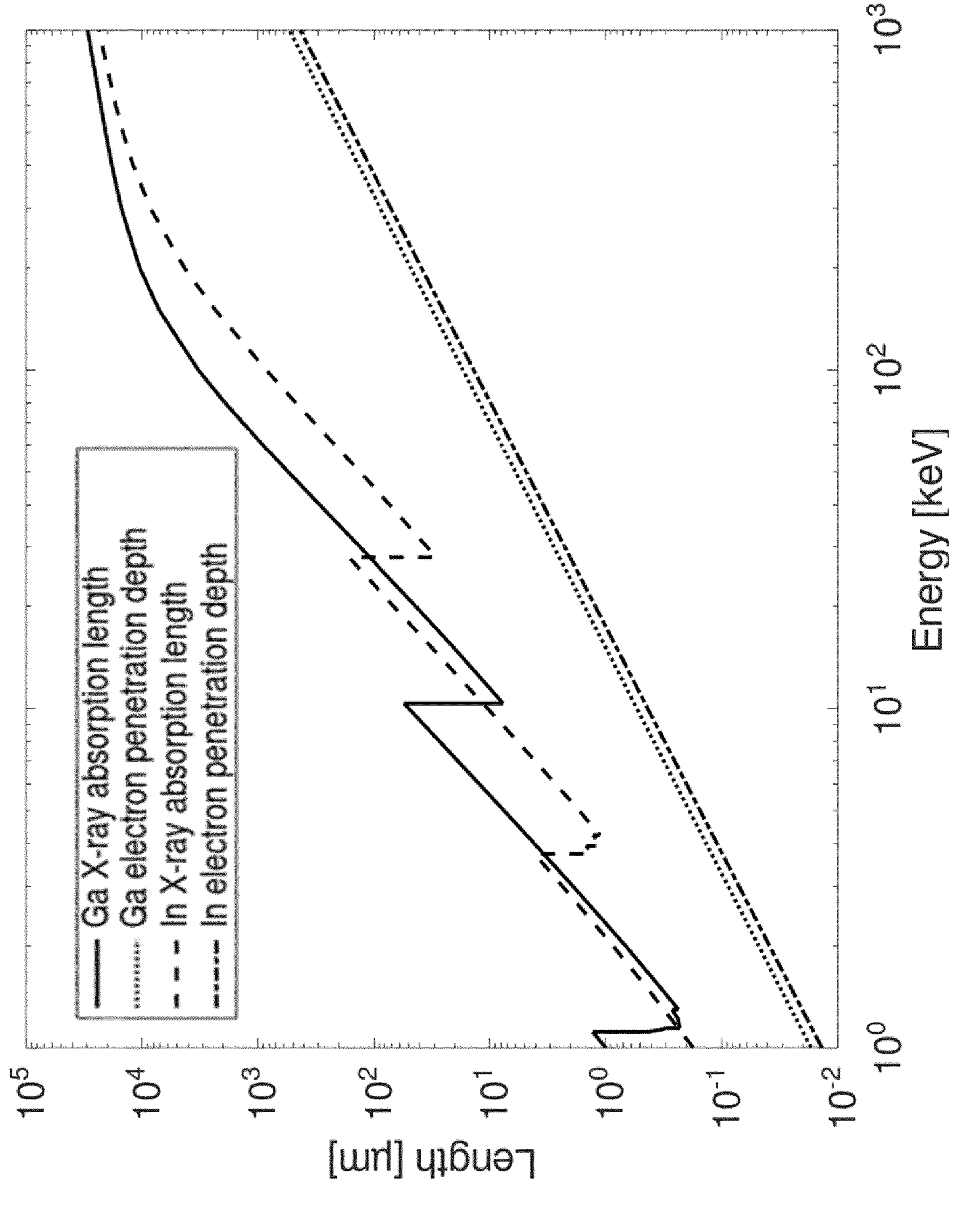

The electron penetration depth depends on electron energy and material properties, as indicated by Equation (1) above. Similarly, the X-ray absorption length depends on the energy of the X-ray radiation and material properties. X-ray absorption is by nature a non-linear process in that the discreteness of electron excitation energies will cause jumps in the absorption spectra. To illustrate this, FIG. 6 shows typical X-ray absorption lengths for Ga and In. X-ray absorption is conventionally quantified by the mass attenuation coefficient μ/ρ where μ is the linear attenuation coefficient and ρ is the density. The densities of Ga and In were set to 5.9 and 7.31 g/cm$^3$ respectively for the plot shown in FIG. 6. For comparison, the figure also shows the electron penetration depths as calculated using Equation (1).

Figure 7:
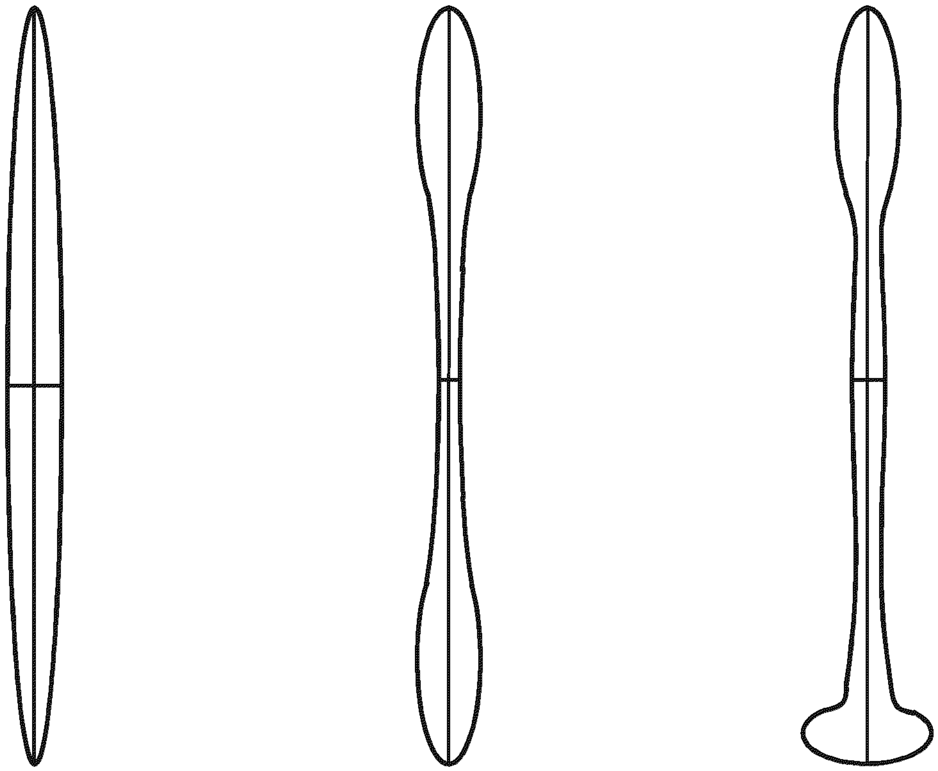
FIG. 7 schematically illustrates various target jet cross-sectional shapes.

In general, in embodiments where the X-ray spot size is defined by the target jet thickness, the problem of providing an X-ray spot having a consistent size is transformed into a problem of providing a liquid jet having a consistent thickness. A target jet having a non-circular cross section can be produced, for example, using a nozzle having a non-circular opening, as described in above-referenced WO 2019/106145. A typical nozzle opening is rectangular with rounded corners, and an aspect ratio of for example 1:2 or 1:4. Alternatively, or in addition, the liquid jet target may be shaped using a magnetic field generator configured to generate a magnetic field that shapes the liquid target into the desired cross-sectional shape. FIG. 7 illustrates some conceivable cross-sectional shapes. While it is preferred to have a target cross section that is essentially elliptical, as shown in FIG. 7(*a*), the target may have a dumbbell cross section as shown in FIG. 7(*b*) or even an asymmetrical cross section as schematically shown in FIG. 7(*c*).

In embodiments of the present invention, the thickness of the target jet in the propagation direction of the electron beam can be in the range 5-150 μm and the width of the target jet is typically in the range 200-500 μm or larger. The width of the target jet is not crucial for the function and may in some implementations have a width of at least 2000 or 3000 μm. An exemplary cross sectional shape of the target jet at the interaction region may be elliptical and about 300 μm along the major axis (i.e. width) and, as indicated in FIG. 6, about 10 μm along the minor axis (i.e. thickness) for electron energies at about 100 keV.

Figure 8:
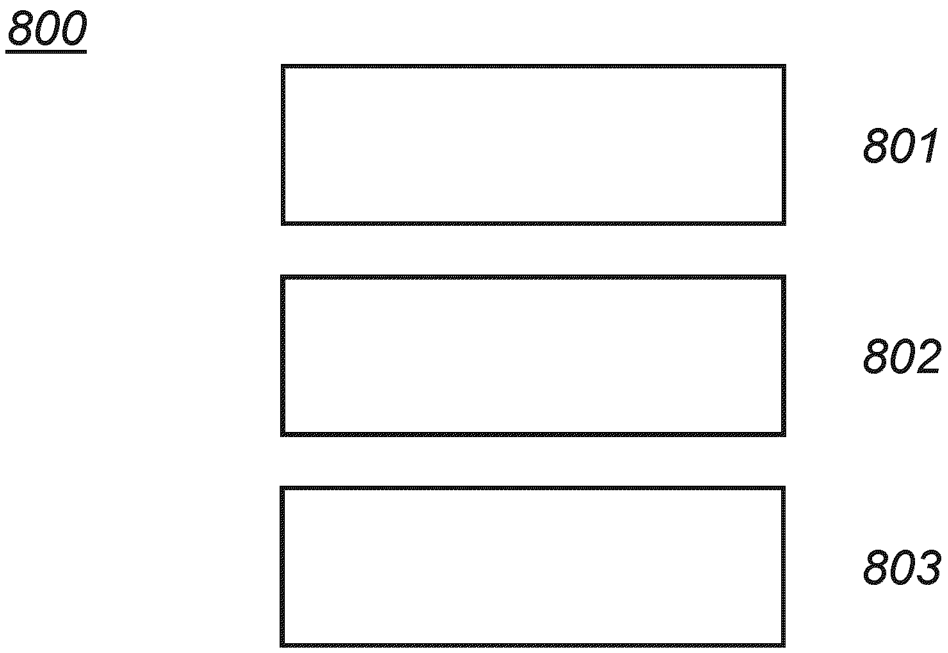
FIG. 8 illustrates a method according to the present invention.

A corresponding method 800 is schematically illustrated in FIG. 8. At step 801, there is provided a liquid jet having an elongated cross section with a major axis and a minor axis. At step 802, an electron beam is provided that interacts with the liquid jet in an interaction region to generate X-ray radiation. At step 803, generated X-ray radiation is extracted at an angle α relative to the major axis. According to embodiments of the present invention, the liquid jet has a thickness, along a propagation direction of the electron beam, that is less than the electron penetration depth of the electron beam in the liquid jet.

The invention claimed is:

1. An X-ray source, comprising a target generator configured to generate a liquid jet having an elongated cross section with a major axis and a minor axis;

an electron source configured to generate an electron beam arranged to interact with the liquid jet in an interaction region to generate X-ray radiation; and an X-ray transparent window arranged to transmit X-ray radiation generated in the interaction region, wherein the X-ray transparent window is located for extraction of X-ray radiation at an angle α relative to the major axis;

wherein the target generator is configured to generate the liquid jet such that said liquid jet has a thickness at the interaction region, along a propagation direction of the electron beam, that is less than an electron penetration depth of the electron beam in the liquid jet.

2. The X-ray source of claim 1, wherein the electron source and the target generator are configured such that the electron beam impacts the liquid jet substantially perpendicularly to the major axis.

3. The X-ray source of claim 2, wherein the electron source and the target generator are configured such that the electron beam impacts the liquid jet at a distance from an edge thereof shorter than an X-ray absorption length; and α is less than 20 degrees.

4. The X-ray source of claim 2, wherein the X-ray transparent window is located, relative to the electron beam, downstream from the liquid jet; and α is about 90 degrees.

5. The X-ray source of claim 2, wherein the electron source and the target generator are configured such that the electron beam impacts the liquid jet at a distance from an edge thereof longer than an X-ray absorption length;

the X-ray transparent window is located, relative to the electron beam, upstream from the liquid jet; and α is less than 20 degrees and greater than zero degrees.

6. The X-ray source of claim 1, wherein the electron source and the target generator are configured such that the electron beam impacts the liquid jet at a distance from an edge thereof shorter than an X-ray absorption length; and α is less than 20 degrees.

7. The X-ray source of claim 6, wherein α is less than 10 degrees.

8. The X-ray source of claim 1, wherein the X-ray transparent window is located, relative to the electron beam, downstream from the liquid jet; and α is about 90 degrees.

9. The X-ray source of claim 1, wherein the electron source and the target generator are configured such that the electron beam impacts the liquid jet at a distance from an edge thereof longer than an X-ray absorption length;

the X-ray transparent window is located, relative to the electron beam, upstream from the liquid jet; and α is less than 20 degrees and greater than zero degrees.

10. The X-ray source of claim 9, wherein α is 3-10 degrees.

11. The X-ray source of claim 1, wherein the target generator is configured to generate a target jet to have a thickness, along the propagation direction of the electron beam, that is 5-150 μm.

12. A method for generating X-ray radiation, comprising providing a liquid jet having an elongated cross section with a major axis and a minor axis;

providing an electron beam that interacts with said liquid jet in an interaction region to generate X-ray radiation; and extracting X-ray radiation at an angle a relative to the major axis;

wherein said liquid jet has a thickness at the interaction region, along a propagation direction of the electron beam, that is less than an electron penetration depth of the electron beam in the liquid jet.

13. The method of claim 12, wherein the electron beam impacts the liquid jet at a distance from an edge thereof shorter than an X-ray absorption length; and α is less than 20 degrees.

14. The method of claim 13, wherein α is less than 10 degrees.

15. The method of claim 9, wherein

X-ray radiation is extracted, relative to the electron beam, downstream from the liquid jet; and α is about 90 degrees.

16. The method of claim 12, wherein the electron beam impacts the liquid jet at a distance from an edge thereof longer than an X-ray absorption length;

X-ray radiation is extracted, relative to the electron beam, upstream from the liquid jet; and α is less than 20 degrees and greater than zero degrees.

17. The method of claim 16, wherein α is 3-10 degrees.

18. The method of claim 12, wherein said liquid jet has a thickness, along a propagation direction of the electron beam, that is 5-150 μm.

* * * * *